J. IRVING.
FIFTH WHEEL.
No. 60,634. Patented Dec. 18, 1866.
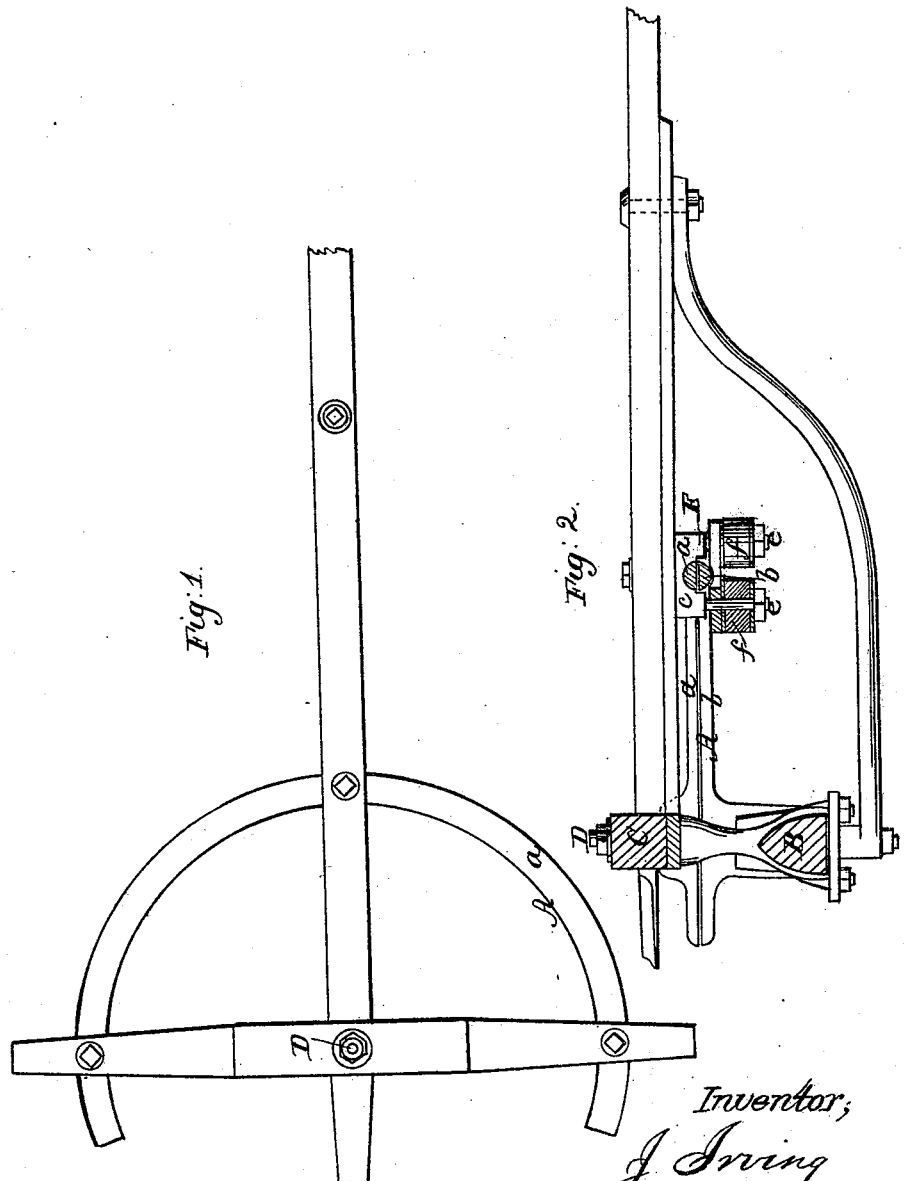

United States Patent Office.

IMPROVEMENT IN FIFTH WHEELS.

JOSEPH IRVING, OF NEW YORK, N. Y.

Letters Patent No. 60,634, dated December 18, 1866.

The Schedule referred to in these Letters Patent and making part of the same.

TO ALL WHOM IT MAY CONCERN:

Be it known that I, JOSEPH IRVING, of the city, county, and State of New York, have invented a new and useful Improvement in Fifth Wheels; and I do hereby declare that the following is a full, clear, and exact description thereof, which will enable others skilled in the art to make and use the same, reference being had to the accompanying drawings, forming part of this specification, in which—

Figure 1 represents a plan or top view of this invention.

Figure 2 is a longitudinal vertical section of the same.

Similar letters of reference indicate like parts.

This invention consists in the arrangement of a safety-clip in combination with the fifth wheel of a carriage or vehicle in such a manner that by said clip the strength of the connection is increased, and the fifth wheel is prevented from rattling.

A represents the fifth wheel of a carriage or vehicle, which is constructed in the usual manner, of two segments, $a$ $b$, one of which is rigidly attached to the axle, B, and the other to the bolster, C, and which are held in contact with each other by the king-bolt D, which forms the common centre of both segments. In ordinary vehicles, particularly in light carriages, the two segments composing the fifth wheel are made of wrought iron, as light as possible and without any other connection besides the king-bolt; and fifth wheels of this construction are liable to rattle after they have been in use for a short time; and furthermore, the connection, which depends entirely upon the king-bolt, is not very strong. These disadvantages are avoided by the application of my safety-clip, E, which consists of two parts, $c$ $d$, one with a semicircular recess to catch over the convex surface of the upper segment of the fifth wheel, and one with a slight recess to receive the convex surface of the lower segment of the fifth wheel; and these two parts are united by bolts or screws, $e$, which are provided with elastic pads or washers, $f$, so that the pressure of the clip is yielding. By these means a clip is obtained which can be drawn up tight enough to prevent the fifth wheel from rattling, and which, when drawn tight, does not interfere with the motion of said fifth wheel. The clip also serves as an additional connection between the two parts of the fifth wheel, whereby the same is strengthened and rendered more durable than a fifth wheel of the ordinary construction.

Having thus described my invention, I claim as new, and desire to secure by Letters Patent—

The safety-clip E, consisting of the part $c$, with the semicircular recess, and the recessed part $d$, between which the fifth wheel plays in the recesses, having a yielding pressure, and secured and operating in the manner and for the purpose specified.

JOSEPH IRVING.

Witnesses:
WM. F. McNAMARA,
ALEX. F. ROBERTS.